H. E. SWEET.

CUTLERY GRINDER.

APPLICATION FILED APR. 8, 1912.

Reissued Oct. 14, 1913. 13,628.

WITNESSES:

Wm. C. Schmitt

W. Lewis Coop

INVENTOR

Homer E. Sweet

BY F. J. Geisler

ATTORNEY

COLUMBIA PLANOGRAPH CO., WASHINGTON, D. C.

UNITED STATES PATENT OFFICE.

HOMER E. SWEET, OF PORTLAND, OREGON, ASSIGNOR TO THE MODERN MANUFACTURING COMPANY, A CORPORATION OF OREGON.

CUTLERY-GRINDER.

13,628. Specification of Reissued Letters Patent. Reissued Oct. 14, 1913.

Original No. 909,707, dated January 12, 1909, Serial No. 433,725. Application for reissue filed April 8, 1912. Serial No. 689,434.

*To all whom it may concern:*

Be it known that I, HOMER E. SWEET, a citizen of the United States, and a resident of the city of Portland, county of Multnomah, and State of Oregon, have invented a new and useful Improvement in Cutlery-Grinders, of which the following is a specification.

This invention relates to cutlery grinders, and one of the principal objects of the same is to provide a simple and efficient machine of comparatively few parts which may be used by an unskilled person for grinding knives, scissors or other cutlery.

Another object of my invention is to provide a cutlery grinder which may be either operable by hand or by means of a motor and which will hold the blade to be ground at any desired angle to the grinding surface in order to give the desired bevel to the blade.

Still another object of the invention is to provide a simple and efficient machine for grinding cutlery which may be adjusted to hold a blade at any required angle to the grinding surface and which will firmly hold the blade in such adjusted position and permit the operator to withdraw the blade at any time without changing the bevel when reinserting the knife or other tool.

These and other objects may be attained by means of the construction illustrated in the accompanying drawings.

Figure 1:
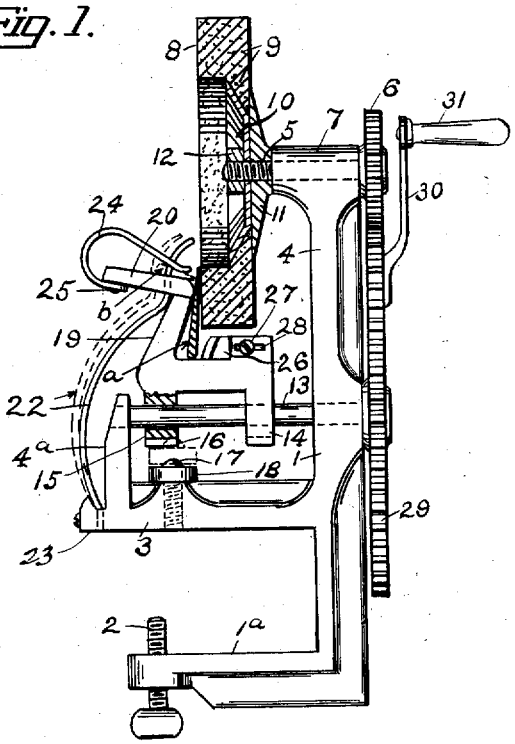
Figure 2:
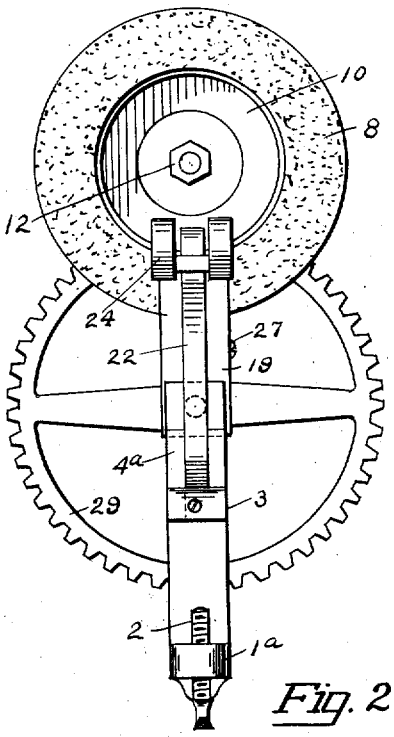
Figure 3:
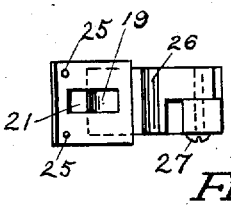

Figure 1 is a side elevation and partial section of a cutlery grinder made in accordance with my invention; Fig. 2 is a front elevation of the same; Fig. 3 is a top plan view of the work holder.

Referring to the drawing for a more specific description of my invention, the numeral 1 designates the machine frame comprising a base arm $1^a$, through which a binding screw 2 passes and a table 3 and an upright arm 4 for supporting the operative mechanism. This frame is adapted to be clamped to a table or other support by means of the binding screw 2.

Mounted in the upper end of the arm 4 is a shaft 5 to one end of which a small gear wheel 6 is attached, said shaft extending through a suitable journal bearing 7, and secured to the other end of said shaft is a grind stone 8 formed in the shape of a ring provided with an internal angular flange 9, which is clamped between a disk or plate 10 and a face plate 11 by means of a screw 12 applied to the threaded end of the shaft 5.

The main shaft 13 is journaled in the upright portion 4 of the frame at one end and in a bracket $4^a$ rising from the opposite portion of the table 3.

Referring now to Figs. 1, 2 and 3, the work holder is shown as mounted upon the main shaft 13, said work holder comprising the two lugs 14 and 15, through which the shaft 13 freely passes, said lugs having each a groove 16 therein to receive the head 17 of a set-screw 18 fitted into a threaded opening in the table 3 and adapted to hold the work holder in an upright position on said shaft by extending loosely into said groove 16 of the lugs 14 and 15. This screw may also be adjusted to secure the work holder in place. Extending upwardly at an inclination is the work holding arm 19, said arm having an upwardly extending supporting member 20, said member 20 having a slot 21 therein through which a spring 22 extends, said spring being secured at 23 to the outer end of the table 3.

For adjusting the back portion of a knife blade to give the required bevel to said blade while being ground I utilize an adjustable gage 26 which is adjusted by means of the set-screw 27, which passes through a slot 28 in a lug formed upon the work holder, as shown more particularly in Figs. 1 and 2.

Secured to the frame 1 by means of the shaft 13 is the main grinding gear 29 which meshes with the small gear 6 and is provided with a suitable crank 30 provided with a handle 31.

The operation of my invention thus far described may be briefly set forth as follows: A knife or blade, *a*, is placed in the machine, as shown in Fig. 1, and held by one hand, while the other hand may be used for turning the crank 30. The bevel at which it may be desired to grind the blade, *a*, may be attained by means of the gage 26. It will be understood that the free movement of the work holder on the shaft 13 allows said holder to adapt itself to any thickness or width of the knife, said holder being spring controlled, and adapted to impose the force of the spring 22 against the blade being ground. When the grind stone is rotated the operator moves the knife back and forth and may withdraw the same whenever required without danger of altering the degree of bevel to be ground upon the blade. The curved spring 24 and the spring 22 hold a scissors blade, *b*, in the proper position for being ground. The force of the spring 22 against the scissors blade, *b*, holds the latter yieldingly against the grind stone. The same arrangement, and the fact that the grinding is done against the side face of the grind stone, also provides for the automatic feeding of the scissors blade in the grinding operation; for the friction of the grind stone, in its revolution, against the scissors blade will carry the latter along its entire length, thus automatically feeding while grinding the same.

From the foregoing it will be obvious that a grinding machine made in accordance with my invention will be found useful in households, hotels and other places where cutlery may be ground by unskilled persons, and that the machine may be manufactured and sold at a low price and will operate quickly and efficiently for its purpose.

I claim:

1. A cutlery grinding machine comprising a frame, means for holding said frame rigidly to a support, a grind stone, a shaft upon which said grind stone is secured, a gear wheel on said shaft, a gear wheel on said frame meshing with the gear wheel on the grind stone shaft, a work holder, an arm for bearing against the blade to be ground, an adjustable gage and a set screw for securing the work holder in adjusted position.

2. In a machine of the character described, and in combination with a rotary grind stone, a work holder comprising an inclined arm to bear against the blade to be ground, an outwardly extending slotted member, and a spring secured to the frame of the machine and extending through said slotted member, and a set screw for securing said work holder in position.

3. In a machine of the character described, and in combination with a rotary grind stone, a work holder mounted upon a shaft and provided with grooved lugs, a set screw mounted in the frame and having a head to engage the grooves in the lugs, an upwardly inclined arm for bearing against the blade to be ground, a lug 33 adapted to throw the knife to the proper bevel against the stone, an outwardly extending holding member having a slot therein, a spring secured to the frame of the machine and extending through said slot, and a curved spring secured to said slotted member.

4. In a machine of the character described, and in combination with a rotary grind stone, a work holder, means for securing said work holder in adjusted positions, an inclined arm on said work holder, an outwardly extending supporting member provided with a slot, a spring secured to the frame of the machine and extending through said slot and a curved spring blade holder secured to said supporting member and adapted to hold a scissors blade up to a grind stone, substantially as described.

5. A cutlery grinding machine comprising a frame, means for holding said frame rigidly to a support, a grind-stone, a shaft upon which said grind-stone is secured, a gear wheel on said shaft, a gear wheel on said frame meshing with the gear wheel on the grind-stone shaft, a work-holder, a forked spring arm bearing against the blade to be ground for holding it on the work-holder, and another spring arm also bearing on the blade between the members of the forked spring arm for holding the blade against the grind-stone.

HOMER E. SWEET.

Witnesses:
H. A. Cooke,
Cecil Long.

Copies of this patent may be obtained for five cents each, by addressing the "Commissioner of Patents, Washington, D. C."